US005553740A

United States Patent [19]

King et al.

[11] Patent Number: 5,553,740

[45] Date of Patent: Sep. 10, 1996

[54] APPARATUS AND METHOD FOR PUMPING CONTROLLED AMOUNTS OF FLOWABLE MATERIAL FROM A FLEXIBLE BAG

[75] Inventors: Kenyon M. King, Rancho Cucamonga; Barry J. Brummett, Santa Ana; Gregory D. King, Rancho Cucamonga; Douglas S. Hutchings, Alta Loma, all of Calif.

[73] Assignee: Restaurant Automation Development Co., Rancho Cucamonga, Calif.

[21] Appl. No.: 342,347

[22] Filed: Nov. 18, 1994

[51] Int. Cl.[6] .......... G01E 11/00

[52] U.S. Cl. .......... 222/1; 222/83.5; 222/88; 222/96; 222/105; 222/146.1; 222/390; 222/492; 239/132

[58] Field of Search .......... 222/1, 81, 82, 222/83, 83.5, 88, 95, 96, 105, 146.9, 333, 386.5, 390, 490, 492, 494; 239/128, 132, 132.5

[56] References Cited

U.S. PATENT DOCUMENTS

| | | | |
|---|---|---|---|
| 3,904,083 | 9/1975 | Little | 222/83.5 X |
| 3,926,339 | 12/1975 | Openchowski | 222/83 |
| 4,335,834 | 6/1982 | Zepkin | 222/390 X |
| 4,635,820 | 1/1987 | Marshall | 222/390 X |
| 4,869,405 | 9/1989 | Rudick | 222/494 X |
| 5,219,099 | 6/1993 | Spence et al. | 222/390 X |
| 5,288,021 | 2/1994 | Sood et al. | 239/132.5 |
| 5,348,585 | 9/1994 | Weston | 222/333 X |
| 5,351,889 | 10/1994 | Whiteside | 239/132 |
| 5,435,462 | 7/1995 | Fujii | 222/83.5 X |

FOREIGN PATENT DOCUMENTS

| | | | |
|---|---|---|---|
| 5034184 | 2/1993 | Japan | 222/390 |

*Primary Examiner*—Joseph A. Kaufman
*Attorney, Agent, or Firm*—Leo R. Carroll

[57] ABSTRACT

A device for pumping controlled amounts of flowable materials having a wide range of viscosities, such as condiments for food, from a bag having flexible walls. The device is comprised of a container to hold the flexible bag, a piston to drive a controlled motion mechanism to compress the bag, a sealing mechanism to seal the bag to constrain flow through a wide range of nozzles, a cutting device to pierce the bag when a seal has been obtained, an exit nozzle(s) to discharge the fluid and to maintain the temperature of the exit nozzle(s). Multiple connections may be made to multiple dispensing points. Dispensing of exact quantities of the flowable material is accomplished by controlling the position of the piston by a stepping servomechanism to displace an exact volume of the flowable material at the exit nozzle. Nozzle temperature is equalized to that of the material in the container by provision of air passages through the nozzle. An alternate embodiment uses a pressure feedback device to control the piston mechanism, this approach applies constant pressure to the flowable material and is used when a variable amount of product is required.

22 Claims, 3 Drawing Sheets

APPARATUS AND METHOD FOR PUMPING CONTROLLED AMOUNTS OF FLOWABLE MATERIAL FROM A FLEXIBLE BAG

BACKGROUND OF THE INVENTION

1. Technical Field

This invention relates generally to apparatus and methods for removal of controlled amounts of flowable materials from within sealed containers, and especially to those devices wherein food materials having wide ranges of viscosities, temperatures, and particulate contents are press pumped from flexible walled bags, which are in turn supported within a more rigid container.

2. Background Art

Flexible walled bottles have long been used to dispense fluids by means of squeezing. Such bottles have been usually made with resilient walls which tend to restore to their original shape after removal of deforming forces. As the ratio of inside air to liquid increases with bottle use, difficulties are encountered in attempting to completely empty the bottle in a timely manner. Solutions to these problems have included placement of the fluid in an inner bag which is sealed within a squeeze bottle. Examples of such structures have been disclosed by Streck in U.S. Pat. No. 4,865,224 and Uhlig in U.S. Pat. No. 4,098,434.

Although the above solutions decreased the time required to empty the bottle, they led to new problems associated with premature bag collapse with potential exit orifice blockage. Semi-rigid internal bag cartridges which lessen these problems were shown early in U.S. Pat. No. 2,608,320 to Harrison, and various supporting structures placed inside the bag are well known, as recently illustrated by U.S. Pat. No. 5,156,300 to Spahni et al. Combinations of such internal bag elements with dispensing means are available, as typified by U.S. Pat. No. 4,138,036 to Bond wherein a helical coil bag insert is coupled with a dispensing spout supported in the neck opening of a rigid external structure. Other combination devices have mated a protected dispensing orifice with bag cutting and sealing means. An example of this approach is shown by Knorr in U.S. Pat. No. 5,127,550, wherein a first member having a throughbore therein is used in conjunction with a second cutting means to seal adjacent portions of a bag wall together while piercing the bag wall for fluid release through the narrow passages cut therein.

While the above devices have been useful in dispensing relatively nonrepeatable doses of liquids having sufficiently low viscosity to permit fluid flow through given fixed exit orifices, difficulties arise in obtaining repeatable portioning of fluids over wide ranges of temperature and viscosity. In the restaurant industry for instance, such devices have been useful in manual dispensing of condiments by customers.

In the area of rapid food preparation however, a need exists to dispense well controlled portions of liquids of various viscosities, or of emulsions, or of colloidal suspensions which can coagulate or settle out with time, or of semi-solid mixtures, such as relish, beans, meat, sour cream, cheese sauces, ketchup, or mustard, all of which have very uneven flow characteristics. In addition, dispensers are required to hold and dispense product at a wide range of temperatures, and must provide maximum safety in dispensing and storage of food products in their original container. All dispensing apparatus used must be approved by the Federal Drug administration (F.D.A.), by the National Sanitation Foundation (N.S.F.) and by local safety regularity authorities. In order to meet such requirements, equipments used must be easily cleaned, made from material that does not support bacterial growth, have minimum bend radii, and eliminate cracks which can hide food particles.

Current trends in the fast food industries indicate continued world wide growth. This will require increased employment of manual labor if the industry continues to hand make the food product sold to their customers. Since this labor force is generally unskilled and has a high turn over rate, the industry will have to automate the food handling both at the restaurant level and at food manufacturing facilities. In addition to labor, cost and space savings, automation will also solve other problems. These include less manual food handling, minimization of incorrect temperature exposure, increased environmental protection, reduced waste, and a more exact ingredient portioning.

The restaurant and consumer industries are making increased use of flexible bags to contain food and other products. These bags are easy to handle and require less storage and shipping space. Current semi-automation is achieved by transferring ingredients into mechanical hand-held dispensing devices or through the use of infitments. Infitments are attached to the bag and used to interface with a dispense hose or nozzle. These infitments are either placed on the bag before loading or attached at location of use. Both means increase the material cost and require additional labor to attach the infitments or fill the mechanical handheld device. Additionally, the excessive product handling necessary to dispense the ingredients causes undesirable waste and food handling risks.

Existing technology for automation at the restaurant level consists of equipment to dispense soft drinks, and timing devices for cooking or melting of food products. Some ingredient dispensing devices use peristaltic or diaphragm pumps, but are limited in their ability to accurately change portioning. Pneumatic pumps, using air pressure to discharge product from a bag are currently the only ingredient pumps that meet most of the restaurant automation requirements. For instance, they are not approved for low acid foods or foods considered to be hazardous, such as meat or beans. Pneumatic pump approaches however are limited in their ability to accurately dispense, usually have a valve and or sensors exposed to the food, and require a source of constant or regulated high pressure air. In these devices the portion or amount of ingredient that is pumped is usually dependent on one or more of the following: air pressure, its rise and fall time, duration of pressure application, valves, exit hole size and product viscosity. As the ingredients are displaced from the flexible bag, the volume of air to be pressurized increases, and the time to achieve pressurization becomes longer. If the time that the air pressure is applied is held constant, then the ingredient portion being dispensed will become smaller as the residual ingredient left in the bag is reduced. A need exists therefore, for a dispensing system which will alleviate the above problems by provision of automatic dispensing apparatus which will provide uniform controlled dosages, be adaptable to operate within an overall computer controlled automation system, and meet the demanding cost and safety requirements of the restaurant industry.

SUMMARY OF THE INVENTION

This invention describes a means of dispensing controlled amounts of ingredients from a flexible bag, with or without infitments, through use of controlled displacement press pump. The dispensing system includes the following:

a container or hopper to hold a flexible walled, food containing bag, the hopper being made removable for rapid replenishment of food products;

a plastic piston, driven by an actuator under computer control to compress the bag in order to displace an exact volume of the flowable material at an exit nozzle, the piston also being easily removable for frequent cleaning purposes;

a servomechanism to control bidirectional displacement of the piston relative to the hopper, so that the piston will be driven to the position necessary to dispense a desired quantity of food product, then will be driven back a short distance in order to relieve pressure at the nozzle which could cause dripping;

sealing mechanisms to seal the bag and permit flow to a wide range of nozzles; and an exit nozzle to discharge controlled food portions, the nozzle including a cutting device to pierce the bag after a seal has been obtained.

Other embodiments further incorporate a flexible hose and nozzle to allow easy access to multiple dispensing points, and temperature control means to maintain safe exit nozzle temperatures.

In the preferred embodiment of this invention, dispensing of exact quantities of the flowable material is obtained by controlling piston displacement so as to provide a uniform quantity of dispensed product independent of the residual quantity in the bag. A stepping servomechanism is used to provide constant positional displacements of controlled distances, resulting in a specific product displacement volume per length of travel. Piston velocity may be easily controlled in order to control product flow rate. In addition, stepping the piston down a given number of steps, and then immediately traveling back up a small number of steps allows for accurate and immediate release of pressure. Since continuing pressure at the nozzle will cause undesirable dripping, this back up feature permits use of a simple elastically deformable diaphragm device to control flow without dripping. This flexible diaphragm is used in a range of durameters and slit sizes so as to aid in the accuracy and portioning of the flow of material. All of the above approaches are designed in such a manner as to allow easy adjustment for a multitude of products with varying viscosities.

When the bag is pierced, its walls press against the removable container and upper portion of the dispense nozzle to form a seal around the pierced hole. The seal is maintained as long as the bag is compressed. The ingredients are pumped by a piston assembly which includes an quickly removable piston head. Although the head is normally only in contact with the flexible bag, the head is made of a hard plastic or ceramic which may be easily cleaned and which meets N.S.F hygienic requirements.

In embodiments in which the pump is to apply constant pressure, the piston acts against a spring compressing the bag with a known pressure. As the bag is emptied of its ingredients, the pump motor maintains the spring at a constant length, supplying constant pressure. In all of the above applications the pump's piston will flatten the flexible bag against the removable container removing almost all of the ingredients.

Foods that must be maintained at specific temperatures, high or low, require that the specified temperature be maintained from the storage container through the dispensing nozzle. This generally means that the ingredient must be dispensed from within a temperature controlled environment or that the path from the container to and including the dispense nozzle be temperature controlled. This invention maintains the correct temperature throughout as well as at the dispensing nozzle and its tip, by using air from the storage area. This air is directed via conduction and natural convection, or is forced to and around the nozzle. Generally, if warm air is necessary, forced air will be used. If cooler air is required, forced air will not be needed since more dense air naturally falls under gravity.

A replenishment process has been designed into the unique product container. This container has multiple simple features such as a handle to permit quick Removability for rapid replenishment of product during high volume periods, and container side walls which serve as guides for the travel of the piston. It also serves as an ingredient hopper, and the insulated front wall of the container serves as the from panel of the device, thus, eliminating a cumbersome access door. This method reduces product handling, since it is portioned directly from its original container, thereby reducing the chance of contamination and loss of quality and the risk of safety hazards associated with poor handling and the corresponding food poisoning.

The entire device is constructed in a modular manner to allow multiple dispensing systems to be placed in a space efficient manner in-line with varying sizes of storage capacities. Since each system is electrically servo controlled, it is may be easily adapted to operate under computer control. When coupled with an order-entry computer, variable portion quantities may the commanded from a central order station or by an end user.

It is a prime object of this invention to provide a food dispenser which will provide consistently accurate portioning through the use of a controlled displacement pump.

It is a further object of this invention to provide a servomechanism controlled food dispensing system which will permit variable ingredient portioning to handle menu changes.

It is an additional object of this invention to provide a computer controlled method of food dispensing which will result in accurate ingredient portioning in response to an ordering station.

It is another object of this invention to provide a food dispensing device with ample storage capacity and rapid replenishment capability to handle ingredients during customer rush hours.

It is yet another object of this invention to provide a food dispensing device which may be connected to the ordering station so as to dispense at the time of customer order.

It is a further object of this invention to provide a dispensing device which may be inexpensively manufactured, is structurally rigid and safe, and can be easily installed in existing food facilities.

The above and other objects, features and advantages of the present invention will become more apparent from the following description when making reference to the detailed description and to the accompanying sheets of drawings.

DESCRIPTION OF THE PREFERRED EMBODIMENT

Figure 1:
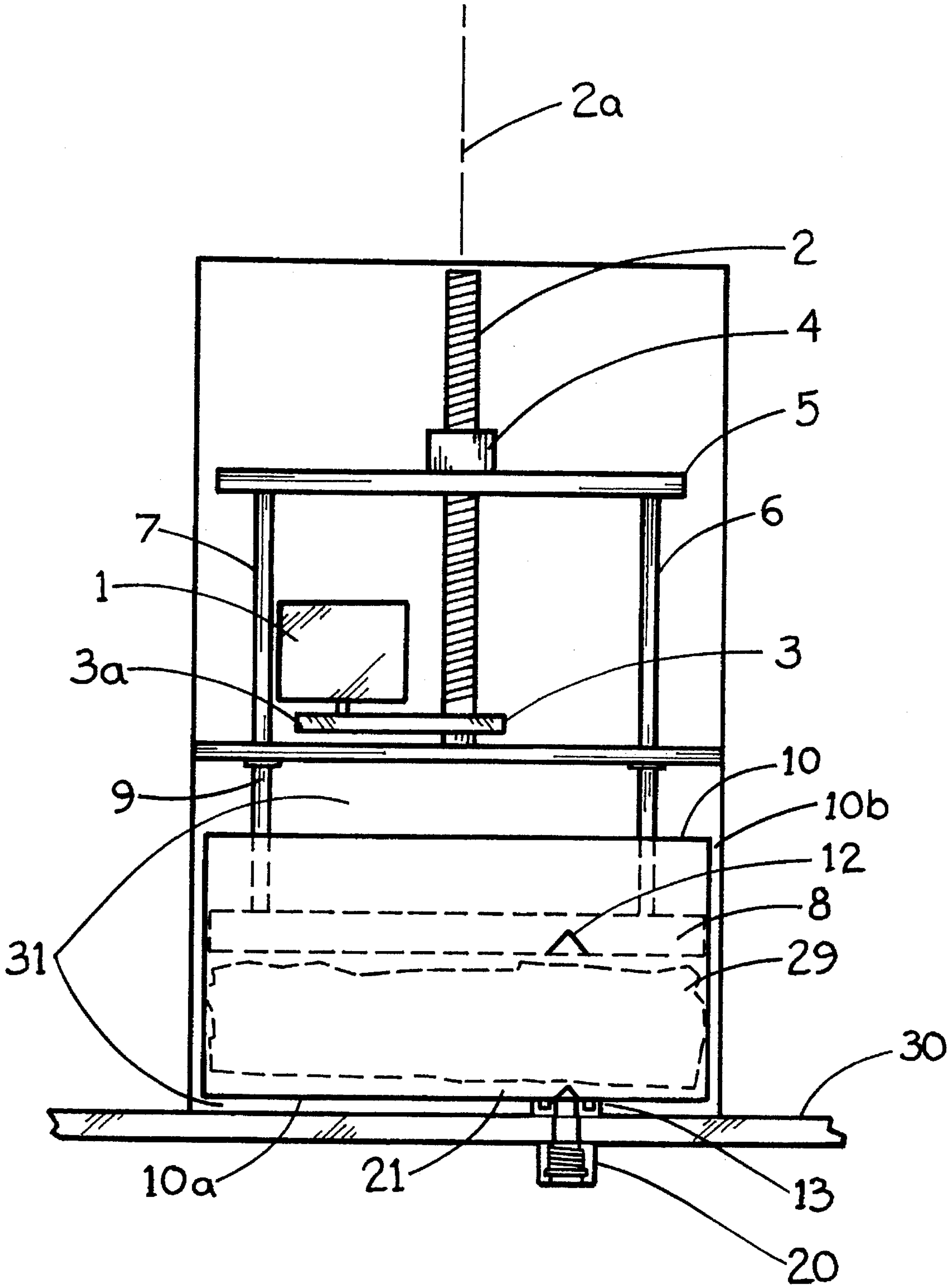
FIG. 1 is a front crossection of the positive displacement pump.

In FIG. 1, the motor 1 drives lead screw 2 by way of pulleys 3 coupled by belts 3*a*. Lead screw 2 drives the assembly consisting of nut 4, nut plate 5, transfer shafts 6, 7, and piston 8, linearly along the vertical axis 2*a* of lead screw 2. Seals 9 are placed around each transfer shaft 6, 7 in order to seal the lower food area from the upper mechanical area. The piston 8, fits snugly into hopper pan 10, but is easily removed for cleaning. Hopper 10 is made removable so as to speed reloading of pump with presealed food bags, for ease of cleaning. As the piston 8 moves down it contacts the flexible bag 29, compressing it between the bottom 10*a* and walls 10*b* of hopper pan 10, and piston 8. The compression causes the flexible bag 29 to seal itself between hopper pan bottom 10*a*, hopper pan walls 10*b*, and around the seal 14 and spike 11 shown in FIG. 2 at location 21. As the flexible bag 29 is further compressed the spike 11, located on the exit nozzle 20, pierces the bag, opening a hole in the flexible bag for dispensing. The indentation 12, on the piston gives clearance for the spike 11, when piston 8 reaches its down limit. Also, the spike may be removed to allow external piercing of the bag through the nozzle with an external device.

Figure 2:
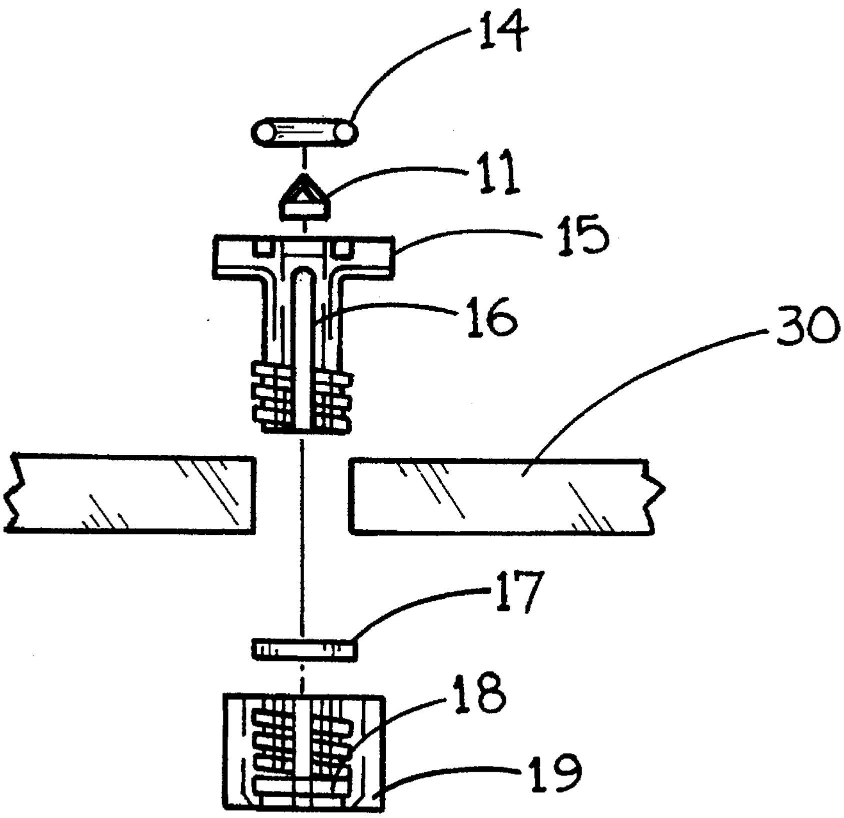
FIG. 2 shows an exploded view of the front crossection of the preferred exit nozzle means.
Figure 3:
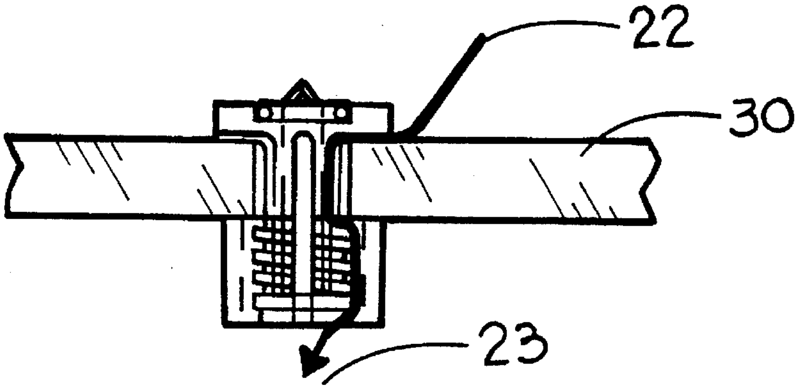
FIG. 3 shows the assembled preferred exit nozzle means of FIG. 2, with the path of air through the nozzle denoted.

The exit nozzle 20, shown exploded in FIG. 2, consists of a mechanical O ring type seal 14, to seal between the base 15 and the hopper pan 10 at location 13; a base 15, having grooved apertures 16, to allow air flow from the temperature controlled food compartment 31 through the insulated base 30 to the exit diaphragm 17, located in area 18. This diaphragm, made of an elastomer such as rubber, comes with varying size slits and a range of durameter ratings in order to accommodate a wide range of viscosities for the flowable materials. The cap 19, holds both the rubber diaphragm and holds the nozzle compressed against the base when screwed onto the base. FIG. 3 shows the path of air 22 from the temperature controlled area 31, to and around the exit nozzle to the outside ambient region 23, thereby maintaining the material in the base 15 though to the exit diaphragm 17 at the controlled temperature.

Figure 4:
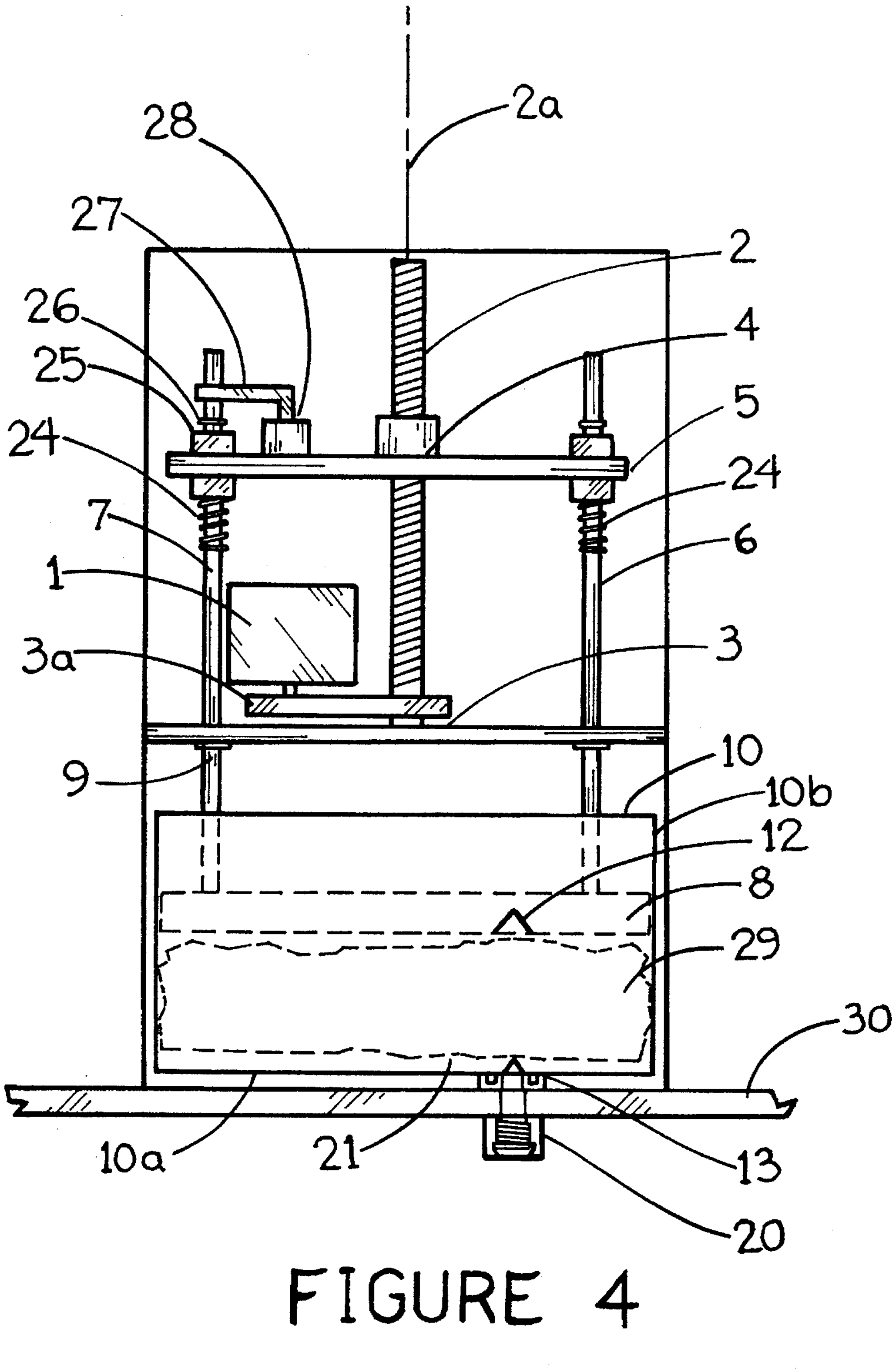
FIG. 4 depicts an alternate embodiment in which the mechanism of FIG. 1 is modified to provide constant pressure.

In an alternate embodiment, the pump can be made to maintain constant pressure. This can be done by either replacing the incremental motor 1 with a constant torque motor, or by modifying the mechanism shown in FIG. 1 by addition of springs 24 and linear bearings 25, as shown in FIG. 4. Motor 1 again drives lead screw 2 by way of pulleys 3 coupled by belts 3*a*. Lead screw 2 again drives the assembly consisting of nut 4, nut plate 5, transfer shams 6, 7, and piston 8, however, when piston 8 reaches the flexible bag, springs 24 are compressed. The distance the springs compress is determined by either a linear sensor or switch 28, which is actuated by bracket 27 attached to transfer shaft 7 and piston 8. Limit 26 restricts travel of nut plate 5 with respect to linear shafts 6, 7.

The basic concepts of the techniques and apparatus for this invention have been illustrated herein and the spirit and scope of the appended claims should not necessarily be limited to those preferred versions.

We claim:

1. A device for pumping controlled amounts of variable viscosity flowable materials stored in a first flexible walled sealed container comprising:

a base having bottom, top and side walls, each said wall having inside and outside surfaces;

second container means to hold the first flexible walled sealed container, said second container being supported by said base and having at least front, bottom and side walls, each said wall having inside and outside surfaces;

piston means connected to the base, said piston means being disposed within said second container means to apply force to at least one top wall of said first flexible walled container so as to compress said first flexible walled container between said piston means and the walls of said second container;

actuation means attached to said base and connected to said piston means to drive said piston means;

exit nozzle means disposed on said walls of said base in order to discharge the flowable material, said exit nozzle means comprising:

nozzle body means connected to said inside of said bottom wall of said base, said nozzle body having a plurality of aperture means for fluid communication therethrough;

exit diaphragm means for dispensing said variable viscosity flowable materials;

cap means for support of said exit diaphragm means, said cap means being disposed under the outside of said bottom wall of said base and removably attached to nozzle body means; and first sealing means to prevent leakage of said flowable materials from around said nozzle body;

cutting means disposed on said nozzle means to pierce and open said first flexible walled sealed container after compression of said first flexible walled container by said piston means; and second sealing means to seal around the opening cut in said first flexible walled container so that said variable viscosity flowable materials are constrained to only flow through said nozzle means.

2. The device for pumping controlled amounts of flowable materials as recited in claim 1 wherein said flowable materials include mixtures of food ingredients.

3. The device for pumping controlled amounts of flowable materials as recited in claim 2 wherein said first flexible walled sealed container is a presealed bag.

4. The device for pumping controlled amounts of flowable materials as recited in claim 3 further comprising third sealing means to prevent fluid leakage between said actuation means and said piston means.

5. The device for pumping controlled amounts of flowable materials as recited in claim 4 further comprising fourth sealing means to separate said piston means from said flowable materials after said bag has been pierced.

6. The device for pumping controlled amounts of flowable materials as recited in claim 1 wherein said flowable materials are maintained at a controlled temperature while disposed within said second container means.

7. The device for pumping controlled amounts of flowable materials as recited in claim 6, further comprising means of controlling the temperature of said exit nozzle means.

8. The device for pumping controlled amounts of flowable materials as recited in claim 1 further comprising sensor means to indicate the position of the piston means relative to said second container.

9. The device for pumping controlled amounts of flowable materials as recited in claim 8 further comprising servomechanism means to control bidirectional displacement of said piston means relative to said second container.

10. The device for pumping controlled amounts of flowable materials as recited in claim 8 wherein said servomechanism means further provides for reversal off the displacement direction of said piston means at the end of each dispensing period so that pressure is relieved between said piston and said flowable materials in said second container.

11. The device for pumping controlled amounts of flowable material as recited in claim 9 wherein said actuation means comprises electric motor means.

12. The device for pumping controlled amounts of flowable materials as recited in claim 11 wherein said electric motor means is an incremental stepping motor.

13. The device for pumping controlled amounts of flowable materials as recited in claim 12 wherein said electric motor actuation means is connected to said piston means so as to provide piston motion linearly proportional to electric motor motion.

14. The device for pumping controlled amounts of flowable materials as recited in claim 12 wherein said piston means is removable from said second container means and said actuation means.

15. The device for pumping controlled amounts of flowable materials as recited in claim 12 wherein said second container means is configured as a closed hopper with an open top disposed under said piston means, whereby said hopper configuration serves as a snug fitting piston retaining wall.

16. The device for pumping controlled amounts of flowable materials as recited in claim 12 wherein said electric motor actuation means is connected to said piston means by lead screw means.

17. A device for pumping controlled amounts of flowable materials as recited in claim 1 wherein at least one of said aperture means in said nozzle body means provides for passage of temperature controlled air from within said second container means through said nozzle means.

18. A method of pumping controlled amounts of variable viscosity flowable materials stored in a first flexible walled sealed container comprising:

providing a base having bottom, top and side walls, each said wall having inside and outside surfaces;

holding the first flexible walled sealed container in a second container means, said second container being supported by said base and having at least front, bottom and side walls, each said wall having inside and outside surfaces;

connecting a piston means to the base, said piston means being disposed within said second container means to apply force to at least one top wall of said first flexible walled container so as to compress said first flexible walled container between said piston means and the walls of said second container;

driving said piston means by actuation means attached to said base and connected to said piston means;

disposing exit nozzle means on a wall of said base in order to discharge the flowable material said exit nozzle means comprising:

nozzle body means connected to said inside of said bottom wall of said base said nozzle body having a plurality of aperture means for fluid communication therethrough;

exit diaphragm means for dispensing said variable viscosity flowable materials;

cap means for support of said exit diaphragm means, said cap means being disposed under the outside of said bottom wall of said base and removably attached to nozzle body means: and first sealing means to prevent leakage of said flowable materials from around said nozzle body:

piercing said first flexible walled sealed container with cutting means disposed on said nozzle means so as to open said first flexible walled sealed container after compression of said first flexible walled container by said piston means; and sealing around the opening cut in said first flexible walled container with second sealing means so that said variable viscosity flowable materials are constrained to only flow through said nozzle means.

19. The method of pumping controlled amounts of variable viscosity flowable materials as recited in claim 18 further comprising the steps of:

sealing between said actuation means and said piston means by third sealing means to prevent fluid leakage into the flowable material side of the piston; and sealing between said piston means and said flowable materials by fourth sealing means to prevent material leakage into the piston area.

20. The method of pumping controlled amounts of variable viscosity flowable materials as recited in claim 18 further comprising the step of maintaining the temperature of the flowable materials through the nozzle.

21. The method of pumping controlled amounts of variable viscosity flowable materials as recited in claim 18 further comprising the step of controlling the bidirectional displacement of said piston means relative to said second container by servomechanism means.

22. The method of pumping controlled amounts of variable viscosity flowable materials as recited in claim 21, further comprising the step of reversing the displacement direction of said piston means at the end of each dispensing period so as to relieve the pressure between said piston means and said flowable materials in said second container whereby leakage from said nozzle will be reduced.

* * * * *